United States Patent [19]

Schepp

[11] 4,354,816
[45] Oct. 19, 1982

[54] THERMOFORMING APPARATUS

[75] Inventor: Frank Schepp, Huntington, Conn.

[73] Assignee: R & G Mold Company, Inc., Milford, Conn.

[21] Appl. No.: 298,077

[22] Filed: Aug. 31, 1981

[51] Int. Cl.³ .................. B29C 3/00; B29C 17/04
[52] U.S. Cl. .................. 425/302.1; 425/388; 425/395; 425/397
[58] Field of Search ............ 425/302.1, 289, 388, 425/394, 395, 397, 398, 407, 303; 264/548; 226/53

[56] References Cited

U.S. PATENT DOCUMENTS

| Re. 26,413 | 6/1968 | Keyes | 264/548 |
|---|---|---|---|
| 2,446,649 | 8/1948 | Gregory | 425/397 X |
| 3,113,345 | 12/1963 | Butsko | 425/302.1 X |
| 3,166,790 | 1/1965 | Keyes | 425/302.1 |
| 3,190,946 | 6/1965 | Keyes | |
| 3,237,242 | 3/1966 | Gerletz | 425/289 X |
| 3,240,851 | 3/1966 | Scalora | 425/302.1 X |
| 3,329,995 | 7/1967 | O'Brien et al. | 425/398 X |
| 3,340,574 | 9/1967 | O'Brien et al. | 425/407 |
| 3,348,748 | 10/1967 | O'Brien et al. | 226/53 |
| 3,359,600 | 12/1967 | O'Brien et al. | 425/302.1 |
| 3,388,625 | 6/1968 | O'Brien et al. | |
| 3,561,057 | 2/1971 | Butzko | 425/397 X |
| 3,611,500 | 10/1971 | Carrigan et al. | 425/303 |
| 3,647,335 | 3/1972 | Brown | 425/302.1 X |
| 3,659,993 | 5/1972 | Brown | 425/394 X |
| 3,749,544 | 7/1973 | Brown | 425/397 |
| 3,785,762 | 1/1974 | Butzko | 425/289 |
| 4,292,266 | 9/1981 | Weder et al. | 425/302.1 X |

Primary Examiner—J. Howard Flint, Jr.
Attorney, Agent, or Firm—Kramer & Brufsky

[57] ABSTRACT

Plastic web advancing apparatus for thermoforming equipment wherein the plastic web is indexed by being pulled between a three-roller arrangement located on the downstream side of a forming press. The rollers are driven by a stepping motor for intermittent indexing of the web through the press. Upstream of the forming press, the web is threadedly received between a pair of relatively movable clamping rollers which upon cyclical opening of the forming press are used to tension and feed the web in conjunction with the three-roller arrangement on the downstream end of the press. Upon closing of the press, the upstream clamping rollers are moved away from each other to release the web, enabling the web to shift and diagonally position its edges in alignment with the forming dies in the press.

14 Claims, 6 Drawing Figures

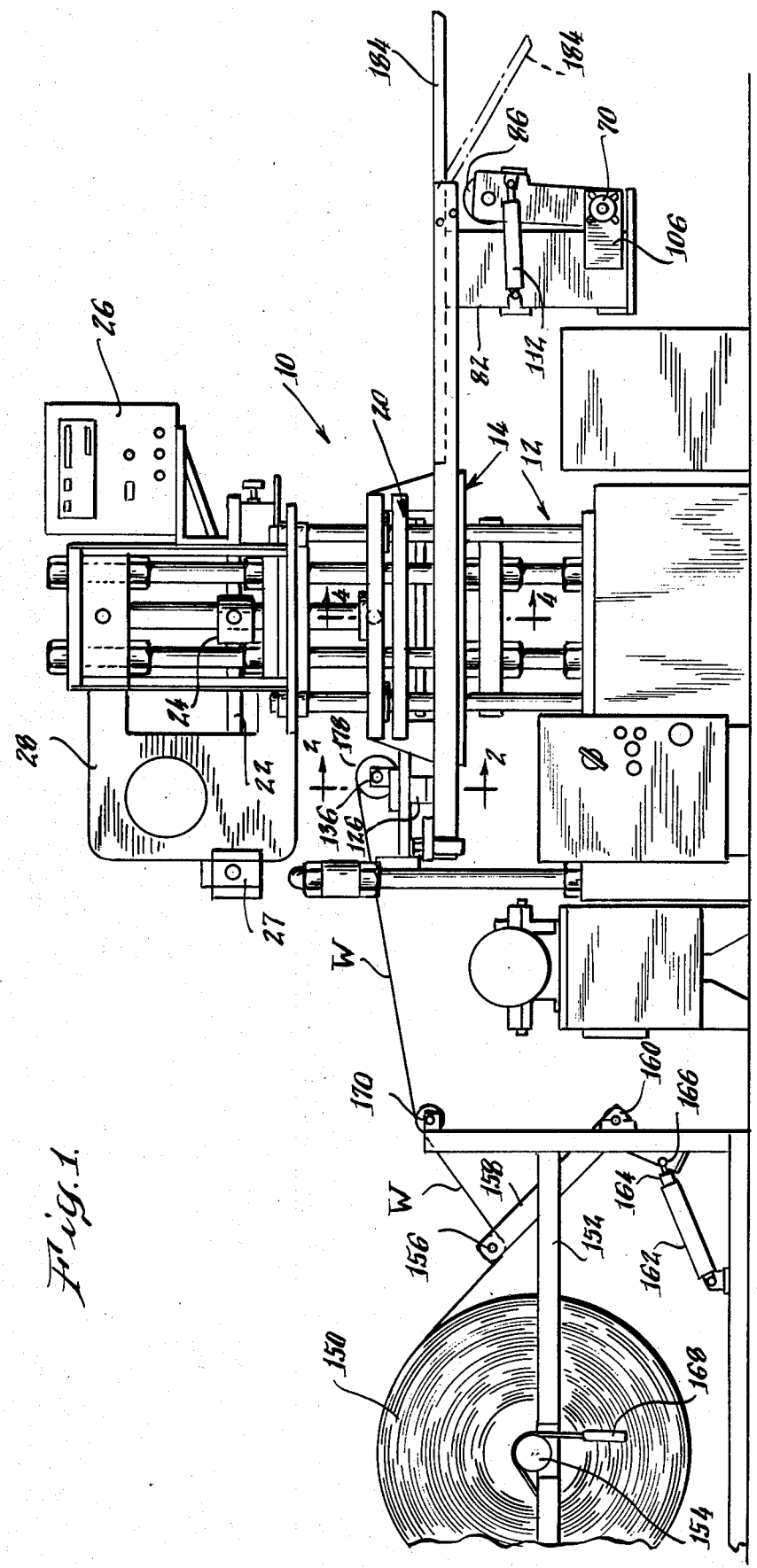

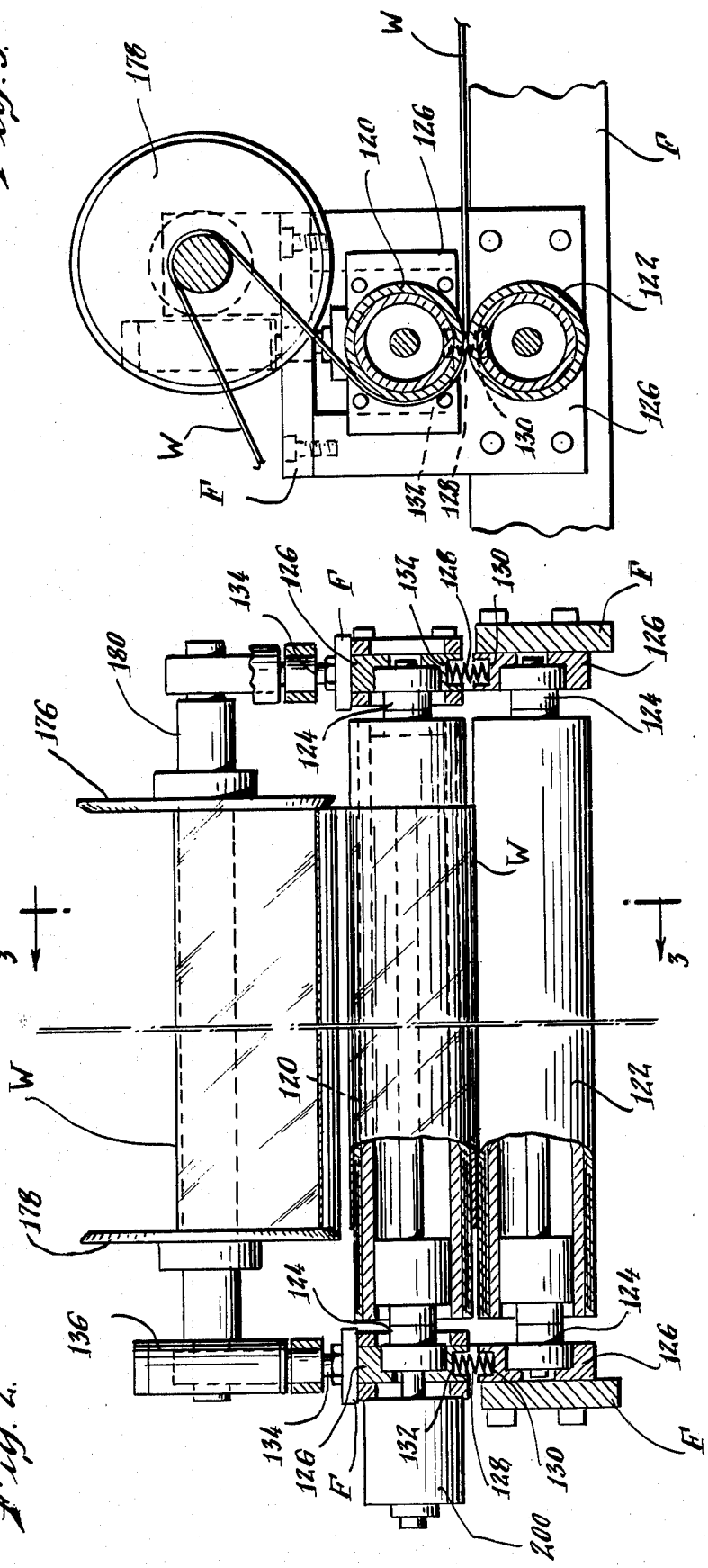

THERMOFORMING APPARATUS

BACKGROUND OF THE INVENTION

1. Field of the Invention

This invention relates to an apparatus for handling a continuous plastic web and forming three-dimensional articles therefrom, and more particularly, a thermoforming apparatus wherein the web is advanced through a forming apparatus including means for heating the web, a forming press capable of forming a plurality of articles from the heated web by pressure differential and matched die forming techniques on a continuous basis, and means for advancing the formed articles and surrounding web matrix out of the press in such a manner so as to more precisely index the web and move it faster without tearing or distorting it than had previously been achieved heretofore in such type of apparatus.

2. Description of the Prior Art

Thermoforming apparatus capable of forming thousands of plastic articles by pressure differential and match die forming techniques on a continuous basis are well-known. An example of such forming equipment is illustrated in U.S. Pat. No. 3,113,345, issued Dec. 10, 1967 to Butzko. In this device, a plastic sheet is advanced between a pair of relatively movable platens of a forming press. Heating means on one of the platens softens the web and positive fluid pressure, such as provided by forced air, is exerted through one of the platens to blow the web against the heated area of the other platen. Once the web has been softened, the air flow is reversed and the heated portion of the web is drawn by a vacuum into a mold cavity in the unheated platen and conforms closely to the walls thereof. Positive fluid pressure, such as provided by forced air, can be exerted through the opposite, heated platen, to aid in forming the web and conforming it to the mold cavity in the opposite platen. The relatively cold surface of the mold cavity cools the formed article.

Cutting means such as a peripheral knife is also provided on one of the platens. Initially, the knife clamps the web to the heated platen when the platens move downwardly relative to each other. Once the softened web is formed by drawing it into one of the mold cavities by the pressure differential technique referred to above, slight movement is given to the knife bearing platen to completely extend it and have it either cut completely through or score the periphery of the formed article in the web matrix.

Upon opening of the platens relative to each other, the formed portions of the web are advanced to a position wherein the formed articles can be stripped from the web, and a subsequent portion of the web disposed in the press. This may be accomplished by bending the edges of the web matrix from a linearly advancing path while interposing an obstruction in the path of the web beneath the formed article to strip it therefrom. Alternatively, the scored or cut articles may be manually removed from the web as it is advanced. An example of such stripping mechanism is illustrated in U.S. Pat. No. 3,166,790, issued to Keyes on Jan. 26, 1965.

Most prior art thermoforming apparatus move or advance the plastic web sheet with a chain mechanism bearing pins which pass through the opposed edges of the plastic sheet. An example of such a structure is illustrated in U.S. Pat. No. 3,348,748, dated Oct. 24, 1967 issued to O'Brien or U.S. Pat. No. 3,785,762, issued Jan. 15, 1974 to Butzko. These chain mechanisms, when driven relatively fast to provide quick indexing and high volume production of the formed articles tend to overrun due to the inertia of the chain. This overtravel is quite unpredictable, varying according to the amount of heating the sheet has undergone in the machine, which makes it relatively easier to move along than when it is cold.

Thus, in order to achieve accurate indexing, it is necessary to drive such web advancing means at a much slower speed than lends itself to real economical production of the formed articles. Otherwise, inaccurate indexing and waste of material of the web matrix will be readily achieved.

The prior art has also attempted to utilize "hitch-style" feeds, wherein opposed edges of the web are gripped between upper and lower fingers which pull the web towards the discharge end of the apparatus. The fingers drop the web and are then returned to their initial position. As with the chain and pin mechanisms, this "hitch-style" feed has a high mass limiting the speed of the feed and the material gripped is prone to slippage as it is conveyed, reducing the indexing accuracy and promoting waste of material.

Accordingly, it has been proposed that the web stock be advanced by pulling it through the forming press by gripping the discharge end of the web after it leaves the press and intermittently pulling the web. However, when heat is applied to the web prior to its entry into or even while in the press, the web cannot be readily pulled through the equipment from the discharge end. This is because the heated web is softened and becomes substantially weakened. This does not allow a large tensile pulling force to be applied to any extent, without holding and feeding the web adjacent its weakened area; otherwise, the opposite edges of the web may become diagonally distorted, elongated, weakened, or wrinkled as it advances because of heating and cooling of the web and cutting of the same during the forming process, resulting in tearing or off-set feeding of the web.

Further, such web advancing apparatus has typically included a pair of tangential rollers forming a nip between which the opposed edges are threaded. This has tended to retard the speed and accuracy of indexing of the web because of slippage of the web in the roller nip.

These and related problems have been solved by use of the web advancing apparatus of the present invention in a substantially conventional thermoforming apparatus using pressure differential and mating die techniques to form articles in a forming press.

SUMMARY OF THE INVENTION

In accordance with the present invention, a thermoforming apparatus utilizing pressure differential forming equipment is provided with a plastic web advancing apparatus for intermittently advancing the web through the forming press. The web is indexed by having the ends of its opposed edges pulled between a three-roller arrangement located at the downstream side of the forming press. The rollers are driven by a stepping motor for intermittent indexing of the web in the forming apparatus. Upstream of the forming apparatus, the web is threadedly received between a pair of relatively movable clamping rollers which upon cyclical opening of the forming press are used to tension and feed the web adjacent the weakened area of the web at the press.

These clamping rollers in conjunction with the three-roller arrangement on the downstream end of the press serve to enable the web to be quickly and efficiently accurately indexed to accommodate the next closing cycle of the forming press than had been possible heretofore. Upon closing of the press, the upstream clamping rollers are moved away from each other to release the web, enabling the web to shift and diagonally position its edges in alignment with the forming dies in the press.

By virtue of the plastic web advancing apparatus disclosed, more economical and efficient operation of the thermoforming apparatus is achieved since more three-dimensional plastic articles per unit time can be formed by the press utilizing less material. This is due to the more precise indexing which can be achieved because of the novel upstream tensioning rollers adjacent the press which enable more accurately controlled incremental feeding of the web to the press without sacrifice of speed or deformation of the web in conjunction with the intermittent pulling force provided on the end of the web by the three-roller arrangement driven by a stepping motor. By moving the upstream tensioning rollers out of contact with the web upon closing of the press, the web is also permitted to shift into precise alignment with the edges of the forming dies and the guidance track of the apparatus which further enhances precise indexing, without chains or fingers gripping the edges to slow operation.

BRIEF DESCRIPTION OF THE DRAWINGS

Further objects and advantages of the invention will become apparent from the following description and claims, and from the accompanying drawings, wherein:

FIG. 1 is a side view in elevation of the thermoforming apparatus of the present invention;

FIG. 2 is a cross-sectional view taken substantially along the plane indicated by line 2—2 of FIG. 1 and illustrates an upstream portion of the web advancing apparatus of the present invention;

FIG. 3 is a cross-sectional view taken substantially along the plane indicated by line 3—3 of FIG. 2.

DETAILED DESCRIPTION OF THE PREFERRED EMBODIMENT

Figure 4:
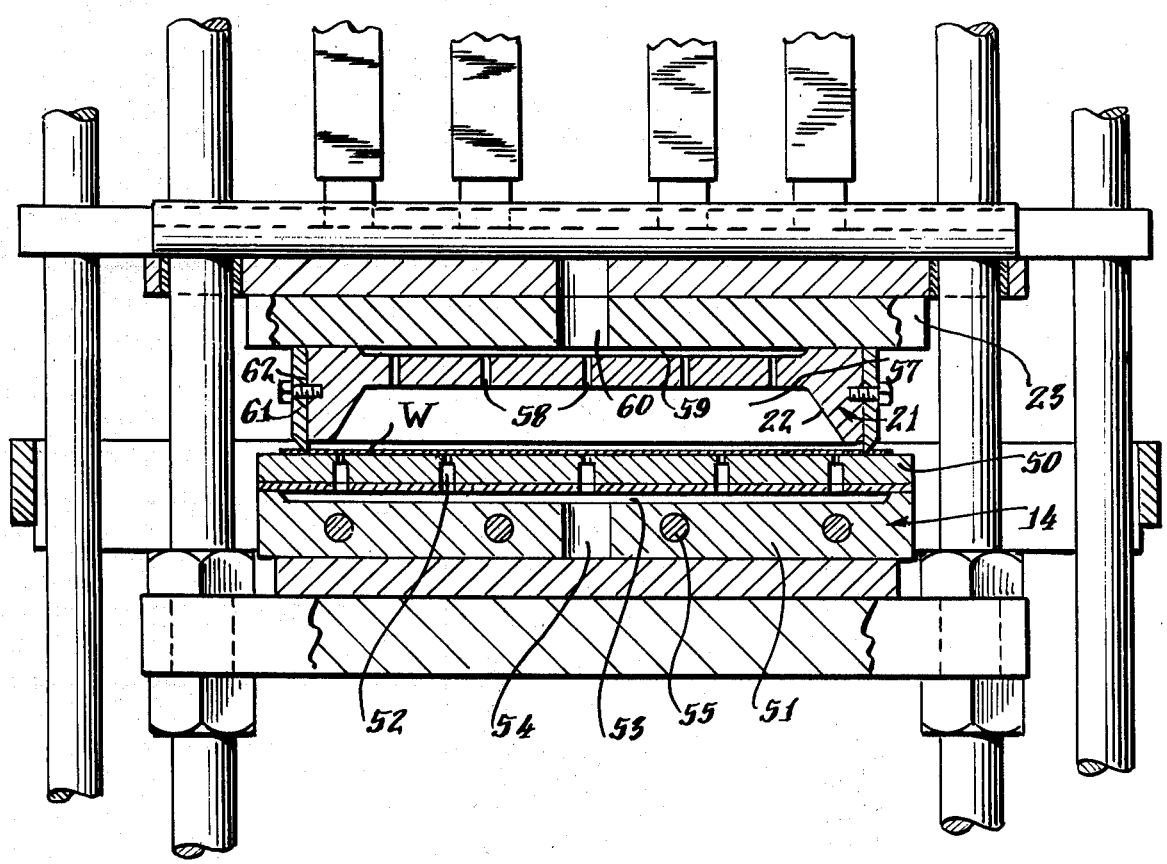
FIG. 4 is a cross-sectional view taken substantially along the plane indicated by line 4—4 of FIG. 1 and illustrates a portion of the forming press utilized in the thermoforming apparatus of the present invention.
Figure 5:
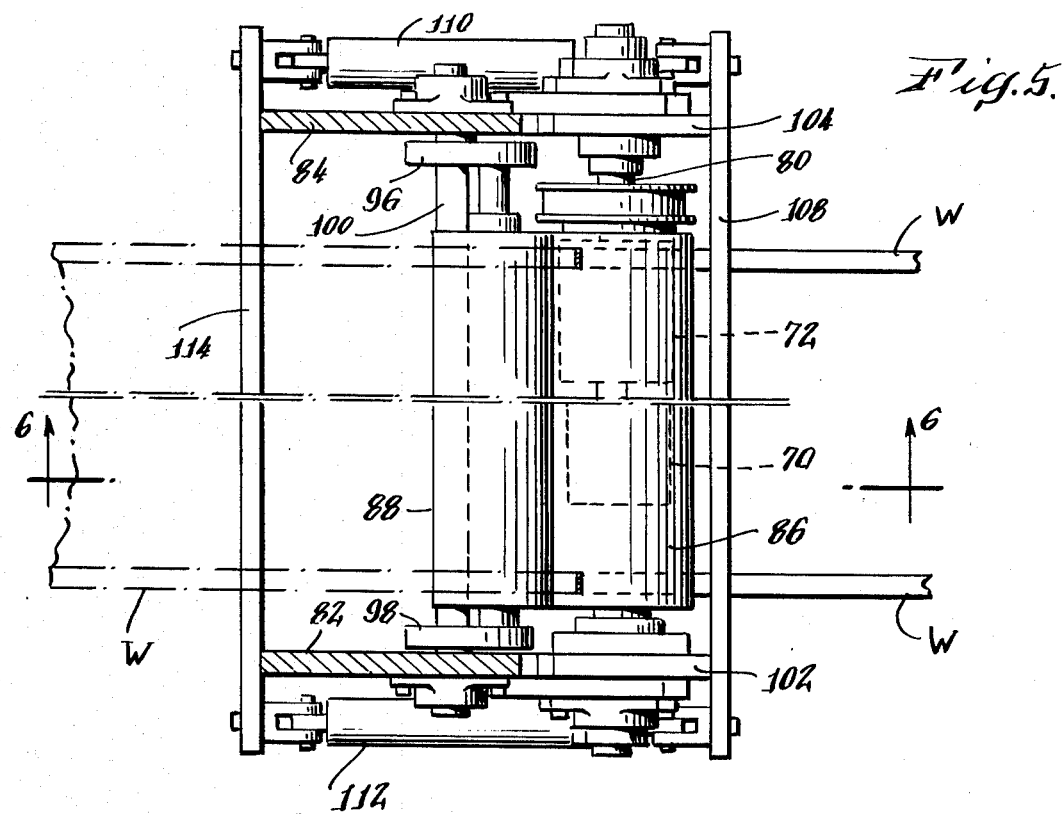
FIG. 5 is a top plan view of the portion of the thermoforming apparatus of FIG. 1 downstream from the forming press.

Referring now to the drawings in detail, wherein like numerals indicate like elements throughout the several views, the thermoforming apparatus of the present invention is shown in FIG. 1 and is designated by the numeral 10.

The apparatus 10 includes means for advancing a plastic web W intermittently through a forming press 12, wherein a plurality of three-dimensional articles are formed in the web W. The press 12 forms no part of the present invention and is well-known in the art. However, for purposes of completion of the disclosure of the present invention, the forming dies of the forming press 12 are illustrated in detail in FIG. 4.

The forming press 10 includes a lower heater platen 14 and an upper mold platen 20. Platen 20 is adapted to be moved vertically relative to the lower heater platen 14 in a well-known manner, as for example, by the elongation or retraction of a piston 22 of a hydraulic cylinder 27 mounted on the frame 28 of press 10. The piston 22 is connected to a toggle linkage 24. Upon retraction or extension of piston 22, the toggle linkage 24 will move the upper or mold platen 20 relative to the lower stationary heater platen 14 in a successive first and second stage as illustrated in U.S. Pat. Nos. 3,113,345, issued Dec. 10, 1967 to Butzko; 3,166,790, issued June 22, 1965 to Keyes; or 3,340,574 to O'Brien, issued Sept. 12, 1967. The mechanism disclosed in these patents to move the upper platen relative to the lower platen is incorporated herein by reference.

The lower heater platen 14 comprises a body member 51 having at an upper surface a heater plate 50, the planar face surface of which is in communication through substantially equally distributed spaced passages 52 of relatively small diameter, with a manifold channel 53 in the body member having an orifice 54 connected with a source of vacuum and/or pressurized air, the selective control of vacuum or pressure being provided by suitable timer-actuated valve means (not shown) controlled by an electronic control apparatus 26 in a well-known manner. Control apparatus 26 is of the type manufactured by Jensel Manufacturing Company of Wolcott, Connecticut, under the designation "Cam 1". The heater platen 14 is heated in a well-known manner by electrically conductive rods 55 suitably distributed in the body member 51 to which electrical current is supplied through a flexible cable connection (not shown).

The upper platen 20 includes a cavity mold 11 provided with a cavity 57 of suitable shape to produce the desired article, and is in communication through suitably disposed passages 58 with a manifold chamber 59 in a supporting plate 23 which in turn is in communication through an orifice 60 with a source of vacuum and/or pressurized air which is selectively controlled in a well-known manner by timer-actuated valve means operated by control apparatus 26.

Connected to the periphery of the cavity mold 22 and corresponding in shape to the outer edge of the article to be formed is a cutter blade member 61, shown in the illustrated example as a circular band secured to the plate 23. This blade is adapted, as will be presently made more fully apparent, to sever a formed article from the plastic sheet W and for this purpose, the projection of its severing edge below the lower side of the rim surrounding the cavity 57 corresponds substantially to the thickness of the sheet W.

In the operation of the forming press 12, the plastic sheet W is first drawn forwardly beneath the cavity mold 22 where it rests upon the heater plate 50 and is clamped thereto by the projecting portion of the cutter blade 61, which is caused by the press to partially penetrate or indent the sheet W. Simultaneously with this action, the sheet is maintained in flat contact with the heater plate 50 either by applying vacuum at the upper side or pressure at the lower side or a combination of vacuum or pressure at the upper and lower sides through the various manifolds 53 and 59, respectively.

As soon as the thermoplastic sheet W becomes heated to the desired molding temperature, the control apparatus 26 which is set to the predetermined heating time actuates the timed value means to reverse the pressures upon the sheet W to cause it to be moved through deformation into conforming relation with the cavity 57 of the cavity mold 22 in the upper platen 20. Such movement may be produced either by pressure at the lower side or vacuum at the upper side of sheet W or a combination of pressure and vacuum. During this forming operation, the edges of sheet W are securely clamped and sealed, at the point marking the outer periphery of the formed article by the partial penetration of the blade member 61.

When the articles are formed and set through contact with the relatively cool cavity mold 22, they are severed from the sheet W and to this end, the blade member 61 is extended to fully penetrate the sheet W and seat against the heater platen 50. This is accomplished by full extension of the toggle linkage 24 by the cylinder 27 controlled by electronic control apparatus 26. Then, at the completion of this operative cycle, the upper mold platen 20 is raised and the formed article may be subjected to positive air pressure above it to assist in its removal from the mold cavity 57.

Upon raising of the platen 20 of the forming press 12, the plastic web or sheet W is intermittently advanced to present an upstream portion of the web W between the platens 14 and 20, and to remove the formed articles from the web matrix.

The web W is intermittently advanced through the forming press 12 by a stepping motor 70. Stepping motor 70 is drivingly connected through a gear reduction box 72 to a pulley 74 mounted on the shaft of the gear reduction box 72. A belt 76 is entrained about pulley 74 and a pulley 78 fixed to a shaft 80 rotatably mounted between a pair of pinch roller arms 102 and 104, pivotably mounted at their lower ends, respectively, to one of a pair of pinch arm support brackets 106 extending outwardly from the bottom of a vertical side plate 82 and 84, respectively, comprising a portion of the frame of the frame of the apparatus 10. Fixed to shaft 80 between arms 102 and 104 is a large roll 86. Intermittent movement of roll 86 is accomplished via stepping motor 70, gear reduction box 72, pulley 74, belt 76, pulley 78, and shaft 80. Operation of stepping motor 70 is controlled by apparatus 26.

Rotatably mounted between plates 82 and 84 in tangential contact with the circumference of roll 86 are a pair of idler rolls 88 and 90. Roller 88 is mounted upon a shaft 92, while roller 90 is mounted upon a shaft 94. Shafts 92 and 94 are parallel to each other and are rotatably received at opposed ends in a pair of L-shaped or crank arms 96 and 98, disposed in parallel planes adjacent side plates 84 and 82, respectively. The central portion of the L-shaped arms 96 and 98 or knee, is fixed to and mounted by a shaft 100 between and journalled to plates 82 and 84 so that arms 96 and 98 can rotate along with rotation of shaft 100.

Figure 6:
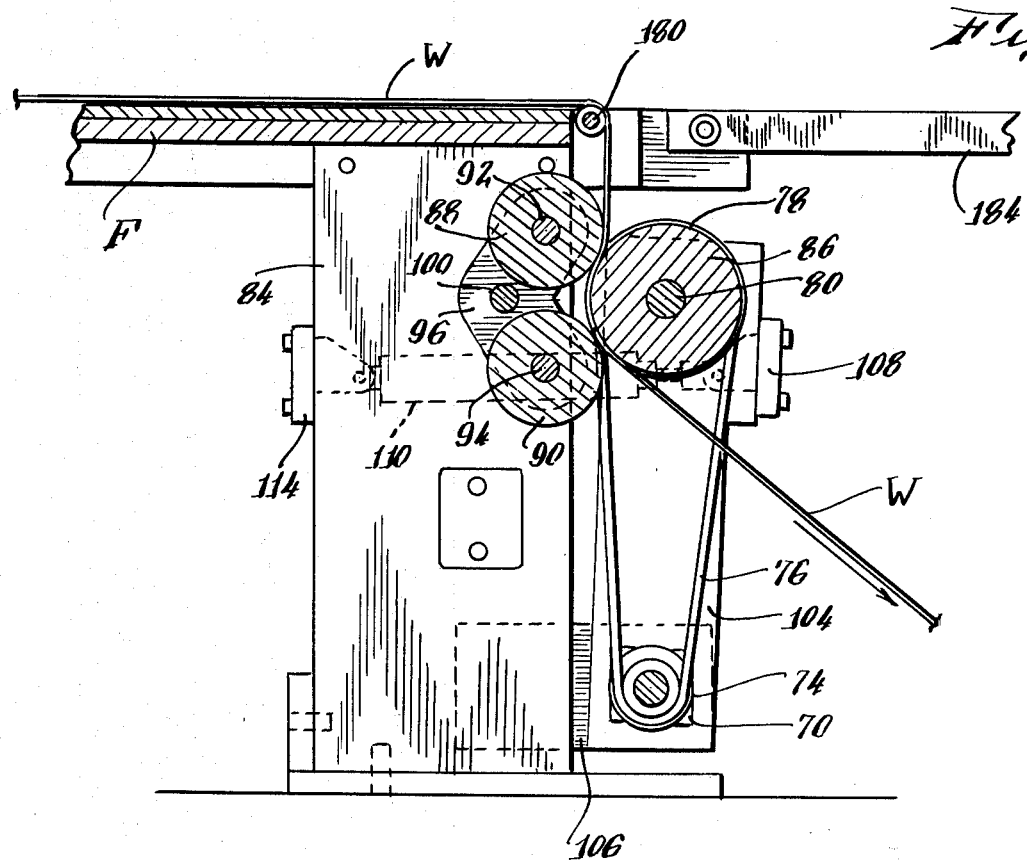
FIG. 6 is a cross-sectional view taken substantially along the plane indicated by line 6—6 of FIG. 5.

Because of arms 96 and 98, one of the idler rollers 88 or 90 will always be in pressing tangential contact with the larger roll 86. That is, should arms 96 and 98 pivot in a counter-clockwise direction about shaft 100 as viewed in FIG. 6, lower roller 90 will bear and exert pressure against the periphery of roller 86. Alternatively, should arms 96 and 98 pivot in a clockwise direction about shaft 100 as viewed in FIG. 6, roller 88 will still remain in contact with and exert pressure on the periphery of larger roll 86. Opposite edge of the web W are bent out of a horizontal plane and threaded between rolls 88 and 86 and 90 and 86, as illustrated in FIG. 6. Upon intermittent rotation of larger roll 86, rollers 88 and 90 will also rotate due to contact with larger roller 86 to intermittently feed the edges of the web W to a suitable collection receptacle.

Tension is always maintained on the take-off or downstream end of the web W by the three-roller arrangement 88, 90 and 86. In the event that one of the rollers 88 and 90 is oscillated relative to roll 86, the other one of the rolls 88 or 90 will always maintain contact with the larger of the rollers to maintain pressure and tension on the take-off end of the web W. Thus, the web W will always be tensioned on its downstream end, but with yieldable pressure to compensate for shrinkage, deformities, or drawing which is common at the web edges due to the heat applied to the web in the forming press 12.

The pinch arms 102 and 104 are connected by a cross member 108. Pivotably mounted on opposite ends of cross member 108 are hydraulic cylinders 110 and 112. At their opposite ends, cylinders 110 and 112 are pivotably connected to a cross bar 114 mounted between side plates 82 and 84.

When it is desired to thread web W between the three-roller arrangement, cylinders 110 and 112 are activated to pivot parallel pinch roller arms 102 and 104 in a clockwise direction, as viewed in FIG. 6 between support brackets 106. This will move roller 86 away from the stationary idler rollers 88 and 90 to permit threading of the web edges between the rollers 88, 90 and 86. Retraction of the cylinder 110 and 112 causes the roller 86 to oscillate in a counterclockwise direction into tangential contact with the periphery of rollers 88 and 90.

At its upstream end, the web W is threaded between a pair of clamping rollers 120 and 122. Each of the rollers 120 and 122 are hollow and have stub shafts 124 connected to each end thereof for rotatably mounting each roller in a pillow block 126. One of the upper stub shafts 124 has a drag brake 200 connected thereto. The lower pillow blocks 126 carrying the stub shafts 124 connected to the lower roller 122 are fixed to the frame F of the apparatus 10. The upper pillow blocks 126 connected to the upper roller 120 via the stub shafts 124 are adapted to float relative to the lower blocks 126 and are vertically movable thereto. A coil spring 128 received in facing grooves 130 and 132 in the upper and lower pillow blocks 126, respectively, connect the upper and lower pillow blocks and normally bias them away from each other.

The upper pillow blocks 126 are connected to the pistons 134 of a hydraulic cylinder 136. Each of the pistons 134 extends through a horizontal frame member F in abutment with upper pillow blocks 126. Upon actuation of the cylinders 136 (controlled by electronic apparatus 26), the pistons 134 are extended to lower the upper pillow blocks 126 relative to the lower pillow blocks 126 against the bias of the springs 132 to firmly clamp the web W therebetween and to provide infinitely adjustable feeding tension for the web upstream of the forming press 12. Such tension is applied when the forming press 12 is opened and the web advanced or indexed relative to the forming press 12. By adjusting the drag force on upper feed roller 120 applied by drag brake 200, the feeding tension on the web W can be controlled and maintained regardless of the type or thickness of the material being conveyed through the apparatus, so that the web W can be stopped and advanced precisely upon demand, without inertia overrun or slippage resulting in accurate longitudinal indexing of the web. When the forming equipment is operational to form articles in the press, pistons 134 are retracted, enabling the springs 132 to move the rollers 122 and 120 apart. This permits lateral and diagonal shifting of the web W in the forming press 12 prior to the forming operation. After the forming cycle is completed, and just prior to the opening of the press, pistons 134 are again extended to provide feeding tension on the upstream end of the web W as it is advanced by rollers 86, 88 and 90 and stepping motor 70. Accordingly, the web W is fully tensioned at all times and in such a manner as to extend full control over its precise advancement and thus indexing without deformation or tearing of the web and without any reduction in speed in the operation of the advancing apparatus. Further, the opening rollers 120 and 122 enable self-alignment of web W with the edges of the platens 14 and 20 in press 12 and the guide track for the web W throughout its advancement through apparatus 10.

In operation, the web W is fed from a roll of plastic material 150 journaled on a suitable support structure 152 by a shaft 154. Web W is unrolled from roll 150 and disposed beneath a tensioning roller 156 mounted on a tensioning arm 158 pivotably connected to the support structure 152 at 160. A hydraulic cylinder 162 pivotably mounted on the support structure 152 has its piston 164 connected to an arm 166 pivotably connected to arm 158 so that upon retraction or extension of the piston 164, the arm 158 can be oscillated to reposition the tension roller 156 to maintain tension on the web W being fed from roll 150, as desired. A counterweight 168 is hung over shaft 154 to restrain rotation of shaft 154 so that the web W can be pulled from the roll 150 only upon a predetermined amount of force applied to the end of the web.

The web W is threaded over roller 170 and over a shaft 180 between parallel feed discs 176 and 178 mounted on shaft 180. Shaft 180 has its opposite ends journaled in portions of the frame F. The web W is then threaded between the relatively moving clamping rollers 120 and 122 through the forming press 12 between the platens 14 and 20.

The edges of the web W downstream from the forming press 10 are supported on portions of the frame F and entrained over an idler roller 180 before being disposed between the three-roller arrangement 88, 90 and 86. A pivotable table 184 can be placed beneath the linear horizontal path of movement of the web W at the downstream end of the apparatus in order to receive the severed articles from the web W as the edges of web W are bent about roller 180. Alternatively, the formed articles can be manually removed from the central portion of the web W.

What is claimed as new is:

1. In a thermoforming apparatus for forming a plurality of articles on a plastic web, said apparatus including
    means for heating said web,
    means for placing said web in close proximity to a mold cavity defining the shape of at least one of said articles to form said articles in response to a difference in pressure on opposite sides of said heated web, and
    means for severing said formed article from said web, the improvement comprising:
    means for intermittently feeding said plastic web to said heating, forming and severing means, said feeding means including
    means downstream from said heating, forming and severing means for intermittently moving the opposed edges of said plastic web, and
    means upstream from said forming, heating and severing means for applying feeding tension to said web as it is intermittently advanced,
    said intermittently moving means downsteam from said heating, forming and severing means including
    a roller arrangement receiving therethrough the opposite edges of said plastic web, and
    said feeding tension means upstream from said forming, heating and severing means including
    a pair of rollers adjacent said forming means disposed in facing relation to each other, and
    means connected to one of said rollers for reciprocally moving said roller vertically with respect to the other in response to completion or initiation of said forming cycle.

2. Apparatus in accordance with claim 1 wherein said feeding tension means is infinitely adjustable.

3. Apparatus in accordance with claim 1 wherein said downstream moving means includes
    a pair of idler rollers in tangential contact with a driven roller receiving the opposite edges of said web therebetween,
    said idler rollers being mounted on opposite ends of a pair of rotatable parallel L-shaped crank arms.

4. Apparatus in accordance with claim 1 wherein said downstream moving means includes:
    a stepping motor,
    a first roller drivingly connected to said stepping motor,
    a pair of smaller, idler rollers in tangential contact with said larger roller, and
    means for oscillatingly mounting said larger roller relative to said pair of smaller rollers.

5. Apparatus in accordance with claim 4 wherein said idler rollers are mounted on opposite ends of a pair of rotatable parallel L-shaped crank arms.

6. Apparatus in accordance with claim 1 wherein said upstream feeding tension means includes:
    means for biasing said rollers away from each other.

7. Apparatus in accordance with claim 6 wherein said biasing means includes spring means between said rollers.

8. Apparatus in accordance with claim 1 wherein said reciprocable moving means includes:
    fluid cylinder means connected to one roller in said roller arrangement for moving said roller relative to at least another roller in said roller arrangement to clamp said web therebetween.

9. In a thermoforming apparatus for forming a plurality of articles on a plastic web, said apparatus including:
    means for heating said web,
    means for placing said web in close proximity to a mold cavity defining the shape of at least one of said articles to form said articles in response to a difference in pressure on opposite sides of said heated web, and
    means for severing said formed article from said web, the improvement comprising:
    means for intermittently feeding said plastic web to said heating, forming and severing means,
    said feeding means including:
    means downstream from said heating, forming and severing means for intermittently moving the opposed edges of said plastic web, and means upstream from said forming, heating and severing means for applying feeding tension to said web as it is intermittently advanced, said intermittently movable means downstream from said heating, forming and severing means including:

a pair of idler rollers in tangential contact with a driven roller receiving the opposite edges of said web therebetween.

10. Apparatus in accordance with claim 9 wherein said idler rollers are mounted on opposite ends of a pair of rotatable parallel L-shaped crank arms.

11. Apparatus in accordance with claim 9 wherein said feeding tension means is infinitely adjustable.

12. Apparatus in accordance with claim 9 including a stepping motor and means drivingly connecting said stepping motor to said driven roller.

13. Apparatus in accordance with claim 9 including:

means for oscillatingly mounting said driven roller relative to said idler rollers.

14. Apparatus in accordance with claim 13 wherein said oscillatingly mounting means includes:

a pair of arms mounting said driven roller therebetween, stationary support means mounting said idler rollers therebetween, means for pivotably connecting said arms to said stationary support means, and motor means between said stationary support means and arms for pivoting said arms relative to said stationary support means.

* * * * *